United States Patent
Chandesris et al.

(10) Patent No.: US 11,958,021 B2
(45) Date of Patent: Apr. 16, 2024

(54) NON-DESTRUCTIVE METHOD FOR DETERMINING THE RESIDUAL HOLDING CAPACITY OF AN ADSORBENT FILTER AND ASSOCIATED TEST BENCH

(71) Applicant: ETAT FRANÇAIS REPRÉSENTÉ PAR LE DÉLÉGUÉ GÉNÉRAL POUR L'ARMEMENT, Paris (FR)

(72) Inventors: Benoît Chandesris, Verrières-le-Buisson (FR); Estelle Soubeyrand-Lenoir, Gif-sur-Yvette (FR); Alexandre Schiavo, Courbevoie (FR); Patricia Soler, Itteville (FR); Maxime Kervella, Arpajon (FR)

(73) Assignee: ETAT FRANÇAIS REPRÉSENTÉ PAR LE DÉLÉGUÉ GÉNÉRAL POUR L'ARMEMENT, Paris (FR)

( * ) Notice: Subject to any disclaimer, the term of this patent is extended or adjusted under 35 U.S.C. 154(b) by 0 days.

(21) Appl. No.: 18/260,855

(22) PCT Filed: Jan. 6, 2022

(86) PCT No.: PCT/IB2022/050088
§ 371 (c)(1),
(2) Date: Jul. 10, 2023

(87) PCT Pub. No.: WO2022/153147
PCT Pub. Date: Jul. 21, 2022

(65) Prior Publication Data
US 2023/0398500 A1 Dec. 14, 2023

(30) Foreign Application Priority Data
Jan. 14, 2021 (FR) ...................................... 2100355

(51) Int. Cl.
*B01D 65/10* (2006.01)

(52) U.S. Cl.
CPC ................................... *B01D 65/10* (2013.01)

(58) Field of Classification Search
None
See application file for complete search history.

(56) References Cited

U.S. PATENT DOCUMENTS

| 1,537,519 A | 5/1925 | Max |
| 1,845,000 A | 2/1932 | Karl et al. |

(Continued)

FOREIGN PATENT DOCUMENTS

| EP | 0903479 A2 | 3/1999 |
| EP | 0903479 A3 | 12/1999 |
| WO | 2009055511 A1 | 4/2009 |
| WO | 2015032923 A1 | 3/2015 |

OTHER PUBLICATIONS

International Search Report for PCT/IB2022/050088 dated Apr. 26, 2022, with English Translation, 7 pages.

(Continued)

*Primary Examiner* — Krishnan S Menon
(74) *Attorney, Agent, or Firm* — NIXON & VANDERHYE

(57) ABSTRACT

A method for determining residual filtration capacity of an adsorbent filter includes: selecting probe and carrier gases; at a given operating temperature, pressure and hygrometry, selecting injection parameters including sudden probe gas concentration variation in the carrier gas for a reference filter; injecting the probe and carrier gases into the reference filter per the injection parameters and measuring the change of probe gas concentration, downstream of the reference filter, for different known reference filter saturation levels, for a filter under test; injecting the probe and carrier gases into the filter under test according to the injection parameters and measuring the concentration change of probe gas, downstream of the filter under test; comparing the concentration (Continued)

change of the probe gas for the filter under test and the reference filter, for determining a saturation value of the filter under test; and deducing the residual filtration capacity of the filter under test.

8 Claims, 6 Drawing Sheets

(56) References Cited

U.S. PATENT DOCUMENTS

| | | | |
|---|---|---|---|
| 3,200,387 | A | 8/1965 | Loscher |
| 5,944,873 | A | 8/1999 | Jager et al. |
| 7,442,237 | B1 | 10/2008 | Gardner |
| 8,205,483 | B1 | 6/2012 | Peterson et al. |
| 2004/0250532 | A1 | 12/2004 | Miura et al. |

OTHER PUBLICATIONS

Written Opinion of the ISA for PCT/IB2022/050088 dated Apr. 26, 2022, with English Translation, 8 pages.

Wahiduzzaman et al., "Processing and Performance of MOF (Metal Organic Framework)-Loaded PAN Nanofibrous Membrane for $CO_2$ Adsorption", Journal of Materials Engineering and Performance, ASM International, Materials Park, OH, US, vol. 25, No. 4, Feb. 22, 2016, pp. 1276-1283.

Praveen Bollini et al., "Dynamics of $CO_2$ Adsorption on Amine Adsorbents. 1. Impact of Heat Effects", Industrial & Engineering Chemistry Research, vol. 51, No. 46, Nov. 6, 2012, pp. 15145-15152.

Praveen Bollini et al., "Supporting Information for: Dynamics of $CO_2$ Adsorption on Amine Adsorbents. 1. Assessment of Heat Effects", Nov. 6, 2012, pp. S1-S6.

Debasish Das et al., "Removal of volatile organic compound by activated carbon fiber", Elsevier, Department of Chemical Engineering, Indian Institute of Technology Kanpur, Kanpur 208016, India, Jun. 25, 2004, pp. 2949-2962.

J. T. Tinge et al., "Absorption of Gases Into Activated Carbon-Water Slurries in a Stirred Cell", Chemical Engineering Science, vol. 47, No. 6, 1992, pp. 1337-1345.

"3M Service Life Indicator technology to help increase confidence in protection", 3M Personal Safety Division, 2015, 4 pages.

George Favas, "End of Service Life Indicator (ESLI) for Respirator Cartridges. Part I: Literature Review", Human Protection & Performance Division, DSTO Defence Science and Technology Organisation, 2005, 49 pages.

International Preliminary Report on Patentability for PCT/IB2022/050088 dated May 19, 2023, with English Translation, 5 pages.

Experimental and fitted curves of the $CO_2$ concentration downstream of an absorbent filter as a function of time Rate of saturation (%)
Change of X3 parameter as a function of the saturation of a filter

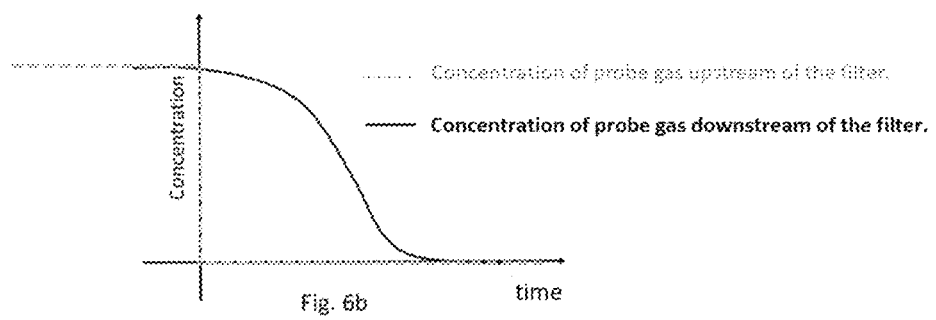

NON-DESTRUCTIVE METHOD FOR DETERMINING THE RESIDUAL HOLDING CAPACITY OF AN ADSORBENT FILTER AND ASSOCIATED TEST BENCH

CROSS-REFERENCE TO RELATED APPLICATIONS

This application is the US national stage of PCT/162022/050088, filed Jan. 6, 2022, which claims the priority of FR FR2100355, filed Jan. 14, 2021. The entire contents of each foregoing application are incorporated herein by reference.

BACKGROUND OF THE INVENTION

Field of the Invention

The present invention relates to the field of adsorbent filtration and relates in particular to a non-destructive method for determining the residual filtration capacity of an adsorbent filter, and to a test bench configured for implementing said non-destructive method.

Description of the Related Art

An adsorbent filter is a system based on adsorbent material (activated carbon, zeolite, Metal Organic Framework, etc.) used for purifying a fluid (air, water, etc.) from contaminants. For example: activated carbon filter for respirator mask, activated carbon filter, etc.
In the preamble, certain technical terms will be defined and then used thereafter.

A target gas is a gas or a vapor to be removed from an air flow, the trapping thereof by the adsorbent bed of the adsorbent filter being part of the primary goal of installing an adsorbent filter. As an example, the target gas can be an atmospheric pollutant or a volatile toxic agent which, in order to protect human respiration, is removed from the ambient air by adsorption in the carbon bed of a filter of a respirator mask.

A carrier gas is a pure gas or a pure vapor or a mixture of gases or vapors circulating continuously through the adsorbent filter. For example, for air purification applications, the carrier gas is often air at atmospheric pressure. The carrier gas is not trapped by the adsorbent filter.

A probe gas is a gas sent occasionally for determining the saturation level of the adsorbent bed of the filter. The probe gas is not trapped by the adsorbent filter.

A parasitic gas is a pure gas or a pure vapor or a mixture of gases or vapors trapped by an adsorbent filter, but which the filter is not intended to trap (e.g. vehicle exhaust emissions for a military filter the purpose of which is to trap toxic war products).

The adsorbent bed of an adsorbent filter is a volume of adsorbent material crossed by a carrier gas flow (e.g. air), having trapping properties with regard to target gases and parasitic gases (e.g. air pollutants) other than the carrier gas and the probe gas. The constituent materials of the adsorbent bed can e.g. be activated carbons (in the form of grains, balls, powders, pellets, fibers or condensates), zeolites and the zeolitic derivatives ZIFs (Zeolitic Imidazole Framework) thereof, MOFs (Metal-Organic Framework) or IRMFs (Isoreticular Metal Organic Framework), organic crystalline porous solids such as COFs (Covalent Organic Framework), aluminosilicates, mesoporous silicas, membranes, screens and composite filtration/adsorption materials, such as glass fibers, cellulose esters, cellulose fibers, kieselguhr or perlite particles, diatomaceous earths, nylon-polyamide, organic polymer membranes (e.g. polyvinylidene fluoride (PVDF), polyether sulfone (PES)), inorganic membranes (made of ceramic or stainless steel), resins, etc.

The breakthrough curve measurement method (called "breakthrough" to keep it simple), illustrated in FIG. 7, is a method of destructive measurement of the filtration capacity of a filter, consisting of the continuous injection of a target gas into a carrier gas upstream of the filter (e.g. cyclohexane in air) at a constant concentration throughout the whole experiment. The measurement of the concentration of the target gas downstream of the filter as a function of time shows the progression of the saturation of the adsorbent layers of the filter. The experiment continues until a target gas concentration is obtained downstream of the filter, equal to the concentration injected upstream of the filter. At the end of such measurement, the filter is inoperative, making the method destructive. For example, the document entitled "Removal of volatile organic compound by activated carbon fiber", Das et al., Carbon, Volume 42, issue 14, 2004, p. 2949-2962, describes a system used for breakthrough measurements through a bed of adsorbent.

The breakdown concentration (known as "end life") is a target gas concentration value downstream of the filter defined according to toxicological criteria (e.g. toxicological threshold) or analytical criteria (e.g. detection limit of a detector). The concentration of target gas injected in a breakthrough measurement is always higher than the breakdown concentration. For example, the breakdown concentration of a respirator mask filter for a toxic agent such as chlorine (Cl2) is reached when the chlorine concentration downstream of the filter reaches the beginning of the toxicological threshold of chlorine, i.e. 0.5 ppm, the wearer of the respiratory mask at such stage being at risk of feeling the first effects on their health such as moderate irritation of the eyes, tearing, blepharospasm, burning sensation in the nose, the throat, sneezing, cough.

The efficiency period corresponds, in a breakthrough measurement, to the time measured between the start of injection of the target gas at constant concentration and the measured time for reaching the breakdown concentration (e.g. toxicological threshold of the target gas, detection limit of a detector, etc.) of target gas downstream of the filter.

The filtration capacity of a filter is defined, for given temperature, hygrometry and target gas concentration, as the maximum mass of target gas retained by the filter, reached during breakdown.

The residual filtration capacity of a filter is the mass of target gas which can still be retained by an adsorbent filter at a given time, before the filter has reached the filtration capacity thereof.

The saturation level of a filter is the ratio between the amount of target gas trapped by the filter at a given time and the total filtration capacity of the filter.

Therefore, since the filtration capacity is the sum of the target gas trapped and the residual filtration capacity, the saturation level can be defined as:

$$\text{Saturation of filter} = 100\% - \frac{\text{Residual capacity of filter}}{\text{Filtration capacity of filter}} \quad [\text{Math. 1}]$$

The concentration peak is the highest concentration of a given component measured with a continuous analyzer during a specified sampling period. [*IUPAC. Compendium of*

*Chemical Terminology,* 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook.]

In the field of air filtration, the purification of an air flow by an adsorbent filter has many advantages:
- it is a commonly used method, well known and industrially mastered;
- it is a relatively inexpensive method, used in many sectors: protection of workers via filter cartridges with activated carbon on respiratory masks, in the military field for air purification, in the aeronautical sector for cabin air purification, etc.

In this respect, a varied literature specifies the different applications thereof.

Generally, the trapping function of an adsorbent filter is not specific to a given pollutant. Thereby, e.g. an adsorbent filter, the function of which is to trap toxic war products in a military context also traps pollutants, such as vehicle exhaust emissions, which will be called "parasitic gas" (see definition hereinabove). Such parasitic gases, trapped by the filter, lead to a decrease in the filtration capacity of the adsorbent filter with respect to the target gas(es), even if there was no exposure to a target gas (in particular a toxic gas). It is thereby possible that an adsorbent filter loses any trapping efficiency with respect to the target gas(es) because of the parasitic gases.

One of the current disadvantages of adsorbent filters is that there is no efficient non-destructive method for determining the residual filtration capacity of the adsorbent filter.

Historically, in the absence of a non-destructive system, a measurement of the residual filtration capacity of a filter is sometimes carried out by the use of the breakthrough method (see definition above) after having used the adsorbent filter. A target gas is thereby injected into the carrier gas, upstream of the filter to be tested, for determining the residual filtration capacity of the filter. Such injection takes place at constant concentration, until the target gas concentration exceeds a certain value downstream of the adsorbent filter. The efficiency period (see definition above), proportional to a mass of target gas trapped, is then compared to the efficiency period obtained on another new filter of the same model with the same features, the latter being proportional to a mass of target gas trapped. The above can then be used for determining the level of saturation (see definition above) of the adsorbent filter. Many patents and publications use such method ("Removal of volatile organic compound by activated carbon fiber", Das et al., Carbon, Volume 42, Issue 14, 2004, p. 2949-2962).

Such method has many drawbacks:
- the residual filtration capacity of the filter is known only after the filter is used: if the filter was no longer efficient, it is found too late that the filter needs to be replaced;
- the method is destructive: if the filter was still efficient, the residual filtration capacity is destroyed by carrying out the test by the breakthrough method;
- the method is expensive, complex to implement and uses target products which are generally toxic—even if the use of substitute or surrogate target gases allows testing to be carried out while limiting the risks, these remain nevertheless destructive.

Alternative destructive methods exist, such as the use of a homothetic or sacrificial filter on the filtration line. The above amounts to bypassing the main filter using a smaller filter—called a "homothetic filter" or a "sacrificial filter", through which a smaller flow-rate flows than through the main filter, the saturation level thereof remaining equivalent to the saturation level of the main filter. Rather than performing a destructive breakthrough test on the large filter for measuring the residual filtration capacity, the residual filtration capacity on the homothetic filter is measured, again by the breakthrough method. The above is described, e.g. in the publication of the international application WO2009/055511A1. Such method is still destructive, and has the following drawbacks:
- it has to be assumed that the homothetic filter is used for accurately transposing the saturation level of the main filter, which is never exactly the case;
- the method remains destructive for the homothetic filter which must thus be changed at each breakthrough measurement carried out;
- the method is still expensive and requires a regular measurement of the residual efficiency of the homothetic filter.

A reliable and non-destructive indicator of the saturation level of an adsorbent filter would be relevant, both from the operational safety point of view and from the economic point of view.

Since 1925, several studies have been conducted for determining, in a non-destructive manner, the residual filtration capacity of an adsorbent filter. The methods envisaged during such research were the following, as explained by the document "End of Service Life Indicator (ESLI) for Respirator Cartridges. Part I: Literature Review"), 2005, Georges Favas, Australian Government, Department of Defense (available in open access on the Internet):
- passive systems:
  - method based on the reaction of the target gas with a reagent (e.g. colorimetric reaction): an indicator within the adsorbent material of the filter is used for demonstrating that the contaminant has reached a certain level in the adsorbent material;
  - method based on the reaction of another air product with a reagent, more particularly by detecting the presence of water downstream of the filter;
  - method based on the release of an odorous substance when the product to be filtered penetrates up to a certain level within the adsorbent material;
- active systems:
  - mechanical method, related to the sensitivity of an element to the presence of the product to be filtered (e.g. wax for which the hardness thereof changes in the presence of the target gas);
  - electrical method, based on the change in impedance of a given material (e.g. polymer) in the presence of the target gas;
  - thermal method: the heat released by adsorption is measured or further melts a material (e.g. wax); and
  - active detector (e.g. flame ionization detector (FID)) which detects the presence of the target gas at a given level of the adsorbent material of the filter.

In the present state of the art, none of such methods is actually used, except for a few colorimetric methods, which have the major defect of being specific to a given compound. Thereby, partial or total saturation of the adsorbent filter by a parasitic gas, preventing the adsorbent filter from absorbing the target gas, cannot be detected if the colorimetric indicator is not sensitive to the parasitic gas.

Most of the time, the above methods are inefficient because:
- the methods are too specific to the target gas (e.g. colorimetry);

the methods are too insensitive (e.g. method of releasing an odorous substance, method using certain active detectors);

the methods are prone to false positives or to false negatives (e.g. method related to temperature variation);

there is a too long response time;

the methods are biased in the very principle thereof (e.g. method using the detection of the presence of water: indeed, even if water can cross through an adsorbent filter (end of the efficiency of the filter with respect to water), a long period of efficiency with respect to the target gas can persist).

Therefore, in the present state of the art, only the method of placing a target gas detector downstream of the adsorbent filter is actually used. Downstream of the detector, a second filter can be used for preventing the rapid saturation of the first filter. Such technique thus requires the equivalent of two filters and is specific to the chemical families that the detector is able to analyze.

SUMMARY OF THE INVENTION

The present invention aims to overcome the drawbacks of the prior art.

The present invention thus relates to a non-destructive method for determining the residual filtration capacity of an adsorbent filter of a given type, the adsorbent filter being apt to adsorb a target gas, characterized in that the method comprises the following steps:

(a) selecting a probe gas and a carrier gas apt to cross through an adsorbent filter of the given type, unsaturated with target gas, without remaining trapped therein, the probe gas having an adsorption isotherm such that at a partial pressure of 0.1 atmosphere of the probe gas, the adsorption isotherm has an adsorption capacity of less than 100 µmol of probe gas per gram of adsorbent, the probe gas being intended for being mixed with the carrier gas, for being injected into the adsorbent filter of the given type, (b) at a given operating temperature, pressure and hygrometry, selecting parameters for the injection of probe gas and carrier gas into an adsorbent filter of the given type, the injection parameters comprising, for the probe gas and the carrier gas, a given period and a given flow-rate over time curve, the concentration of the probe gas in the carrier gas including at least one sudden variation during the injection period, each sudden variation in the concentration of the probe gas with regard to the injection parameters of the probe gas being characterized by an absolute value of the time derivative of the concentration of the probe gas exceeding 100 ppmv/s, for an adsorbent filter of the given type, called reference filter, (c) injecting, at the given operating temperature, pressure and hygrometry, the probe gas and the carrier gas into the reference filter according to the injection parameters of the step (b) and measuring the change over time in the concentration of the probe gas, downstream of the reference filter for known increasing amounts of target gas adsorbed by the reference filter, the latter of such quantities corresponding to the breakdown of the reference filter, and deducing the filtration capacity $m_a$ of the reference filter, for an adsorbent filter of the given type for which the residual filtration capacity is to be determined, called filter under test, (d) injecting, at the given operating temperature, pressure and hygrometry, the probe gas and the carrier gas into the filter under test according to the injection parameters of the step (b) and measuring the change over time in the concentration of the probe gas downstream of the filter under test, (e) comparing the change over time of the concentration of the probe gas for the filter under test and for the reference filter, for determining a saturation value of the filter under test $\tau_{sft}$, and (f) deducing the residual filtration capacity of the filter under test by the following calculation: residual filtration capacity=$(1-\tau_{sft})*m_a$.

Downstream and upstream of the filter means with respect to the direction of circulation of the target, carrier or probe gas through the adsorbent filter. The downstream thus corresponds to the outlet of the adsorbent filter, the upstream corresponds to the inlet of the adsorbent filter.

The operating temperature, pressure and hygrometry do not need to be controlled, same just need to be measurable and remain identical during the steps (b), (c) and (d).

The step (c) for the reference filter and the step (d) for the filter under test are performed sequentially.

The probe gas and the carrier gas, unlike the target gas, cannot be permanently trapped by the adsorbent filter.

At least one of the probe gas and the carrier gas needs to be detectable downstream of the adsorbent filter: if the probe gas is detectable, the change in the concentration thereof downstream of the adsorbent filter can be directly detected. If the carrier gas is detectable, it will be possible to deduce from the change over time of the concentration thereof downstream of the adsorbent filter, by knowing the injection parameters, the change over time of the concentration of the probe gas downstream of the adsorbent filter.

The concentration of the components of the carrier gas will advantageously be stable over time. The injection of probe gas will cause a sudden variation in the concentration of at least one of the compounds of the probe gas and of the carrier gas during the injection period.

The reference filter and the filter under test, of the same type, have the same features and thus the same filtration capacity. The filtration capacity ma of the reference filter can be expressed as the mass concentration of target gas sent during a breakdown test multiplied by the flow through the filter multiplied by the efficiency period.

According to one embodiment of the invention, the concentration of probe gas downstream of the filter is measured continuously with a detector suitable for the probe gas over time, with the best possible acquisition frequency. It is also possible to measure the concentration of carrier gas and to deduce the concentration of probe gas. For example, if it is sought to measure the residual filtration capacity according to the method of the invention for an adsorbent filter having $CO_2$ as probe gas and air as carrier gas, it would be possible to inject a sudden variation of nitrogen into the flow crossing through the filter under test and to measure the concentration of nitrogen at the outlet of the adsorbing filter for deducing, from the change over time of the concentration of nitrogen, the change over time of the $CO_2$ concentration (the concentration of $CO_2$ in the air being known) and hence the saturation level of the filter. Similarly, the concentration of $CO_2$ in the air as a carrier gas can be monitored, the injection of nitrogen being used for causing, by dilution, the significant change of the concentration of $CO_2$. As such, a given compound, such as $CO_2$, of the carrier gas can be considered as a probe gas, as long as the injection of the probe gas, such as nitrogen, causes a significant change in the concentration of said compound of the carrier gas. As an example, but not limited to, the detector used will be a Fourier transform infrared detector or an infrared detector such as a non-dispersive infrared detector (NDIR). Such measurements will be recorded so that same can be used in the following steps (e) and (f). Said step lasts a period of time which depends on the nature of the probe gas, the sudden variation of probe gas sent into the upstream air flow, on the adsorbent, on the saturation of the adsorbent, on the temperature and on the relative hygrometry. Said step can end automatically when the time derivative of the concentration of probe gas downstream of the filter, taken as an absolute value, is less than 10 ppbv/s.

According to one embodiment of the invention, the curve of concentration of probe gas downstream of the filter as a function of time is analyzed mathematically. A numerical quantity called hereinafter "curve signature" is then extracted. The signature can be:

when the sudden variation is a concentration peak, the value of the concentration peak of the probe gas, being measured downstream of the filter during the experiment (concentration);

when the sudden variation is a concentration peak (according to the definitions at the beginning of the document), the width of the concentration peak of the probe gas during the operation (time period);

the time period between the start of the injection of the probe gas upstream of the filter and the start of the detection of the probe gas downstream of the filter (time period);

the parameters derived from a mathematical fitting of the curve of concentration of the probe gas downstream of the filter, with a plurality of fitting parameters. For example, a five-parameter fitting $x_1$, $x_2$, $x_3$, $x_4$, and $x_5$ can be used, according to the following equation:

$$y = x_4 + \frac{1}{2} \cdot \frac{x_5}{x_3} \times \exp\left(\frac{1}{2} \cdot \left(\frac{x_2}{x_3}\right)^2 - \frac{t-x_1}{x_3}\right) \times \operatorname{erfc}\left(\frac{\frac{x_2}{x_3} - \frac{t-x_1}{x_2}}{\sqrt{2}}\right) \quad [\text{Math. 2}]$$

$$\operatorname{erfc}(x) = \frac{5}{\sqrt{\pi}} \int_x^\infty e^{-t^2} dt$$

In the above equation, y represents the concentration of probe gas downstream of the filter, t represents the time, and the parameters x1, x2, x3, x 4 and x5 are determined by a software program as being the parameters used for obtaining a theoretical curve according to the equation which is closest to the curve of concentration of the probe gas, measured experimentally downstream of the reference filter or of the filter under test.

The change over time of the curve of concentration of the probe gas measured downstream of the reference filter or of the filter under test is thus entered as a series of measurements in a software program which will fit the change over time in the form of a curve according to the above equation, and will automatically calculate the parameters x1, x2, x3, x4 and x5. A conventional state-of-the-art algorithm for minimizing the distance between the experimental curve and the theoretical curve is used for adjusting the parameters numerically (see experimental curves and approximation curves in FIG. 3). The use of the parameter x3 e.g. then makes it possible to give a specific signature to the curve of concentration of the probe gas over time. As an example, FIG. 4 presents the experimental data obtained which are used for linking the parameter x3 obtained in FIG. 3, to the saturation level of the filter. A signature of the curve of concentration can consist of one amongst a parameter or a combination of parameters of the mathematical fitting which, over the saturation range of the reference filter, has a monotonic variation and a maximum derivative depending on the saturation level, and the comparison of the signature of the curve of concentration between the filter under test and the reference filter.

According to one embodiment of the invention, the signature obtained is compared with the abacuses produced beforehand with the measurements made during the step (c) on the reference filter. The abacuses have to take into account as parameters, the hygrometry and the temperature of the probe gas and of the carrier gas, and the saturation level of the filter. The shape of the curve of the concentration of probe gas as a function of time downstream of the adsorbent filter is dependent on the level of saturation of the adsorbent filter. Thereby, the value of the signature of the curve of the concentration of probe gas as a function of time, downstream of the filter, can be used for determining the saturation level of the adsorbent filter tested, and thus the residual filtration capacity of the latter.

The invention thus lies in the equivalence made between a curve of concentration of probe gas as a function of time, as measured beforehand on a reference filter of a given type, for a plurality of values of saturation level, which is used for forming a reference, in particular by producing abacuses with the values measured during the step (c), and the curve of concentration of the probe gas measured with a non-destructive method on a filter under test of the same type as the reference filter. The same type means the same model of adsorbent filter having the same features.

According to one embodiment, each sudden variation in the concentration of probe gas in the injection parameters of the probe gas is characterized by an absolute value of the time derivative of the concentration of probe gas which exceeds 100 ppmv/s.

A sudden variation can e.g. be a peak in the concentration of probe gas in the carrier gas, a through in the concentration of probe gas in the carrier gas, or further a rising or a falling step in the concentration of probe gas in the carrier gas.

As an example, and without limiting the scope of the patent, a temperature and a relative hygrometry of the carrier gas, of air at atmospheric pressure, of 23° C. and 40%, respectively, are measured. A zero concentration of CO2 is then injected 2 seconds after the start of the test according to the method of the invention, then a sudden variation over 20 ms leading to reaching a concentration of 4000 ppmv of CO2, with a concentration plateau for 1 second at 4000 ppmv before going back, in 20 ms, to a zero concentration of CO2 in the flow of carrier gas.

The concentration of probe gas C can also e.g. have a sinusoidal change over time of the type $C = C0 \sin(\Omega^* t)$ with $\Omega = \pi/T$, and a value of zero otherwise. As a non-restrictive example, $C0° = 4000$ ppmv and $T = 1$ second.

The time derivative of the concentration of probe gas downstream of the filter will be smaller in absolute value than the derivative upstream of the filter and will depend on the saturation level of the filter. It is thus possible, for a sudden variation, to determine the saturation level of the filter.

According to one embodiment, the probe gas has an adsorption isotherm such that, at a partial pressure of 0.1 atmosphere of probe gas, the adsorption isotherm has an adsorption capacity of less than 100 μmol of probe gas per gram of adsorbent. Similarly, the carrier gas has an adsorption isotherm such that, at a partial pressure of 0.1 atmosphere of carrier gas, the adsorption isotherm has an adsorption capacity of less than 100 µmol of carrier gas per gram of adsorbent. The carrier gas and the probe gas are thus not trapped by the adsorbent filter or are trapped in a negligible manner and thus cannot be measured by a breakthrough measurement.

According to one embodiment, the comparison of the change over time of the concentration of the filter under test and of the reference filter includes the search for at least one parameter representative of the sudden variation in the concentration of the probe gas on the curve of concentration of the probe gas measured downstream of the filter, and the comparison of the parameter representative of the sudden variation of concentration between the filter under test and the reference filter.

According to one embodiment, the comparison of the change over time of the concentration of the filter under test and of the reference filter includes the calculation of the time of changing from 95% to 5% of the maximum value of the concentration of probe gas downstream of the adsorbent filter obtained after the sudden variation of concentration in probe gas, and the comparison of the value of the time calculated between the filter under test and the reference filter.

According to one embodiment, the comparison of the change over time of the concentration of the filter under test and of the reference filter includes the calculation of the period of time between the start of the sudden variation of the probe gas in the flow of carrier gas and the quantifiable start of the change of concentration of probe gas downstream of the filter, and the comparison of the value of the time period calculated between the filter under test and the reference filter.

According to one embodiment, the comparison of the change over time of the concentration of the filter under test and of the reference filter comprises the computation of a mathematical fitting with a plurality of parameters of the curve of concentration of probe gas measured downstream of the filter, the determination of a signature of the curve of concentration consisting of one amongst a parameter or a combination of parameters of the mathematical fitting which, over the range of variation of the saturation level of the reference filter, has a monotonic variation and a maximum derivative depending on the saturation level, and the comparison of the signature of the curve of concentration between the filter under test and the reference filter.

According to one embodiment, the carrier gas is at least one among: air, oxygen (O2), hydrogen (H2), nitrogen (N2), argon (Ar), helium (He), the above-mentioned pure gas mixtures used as calibration gas during calibration, over- or under-oxygenated gas mixtures such as the mixtures used for deep diving (examples: Trimix®, heliair, heliox, surox, nitrox, triox or helitrox), medical gases (e.g. nitrous oxide, equimolar oxygen-nitrous oxide mixtures (French acronym MEOPA), nitric oxide (NO)), pulmonary function testing (French acronym EFR for Exploration Fonctionelle Respiratoire) gases, breathing mixtures such as helium/oxygen and other gas mixtures used for the treatment of certain hearing losses (MEDI OD 93, MEDI OD 95, the two mixtures being marketed in particular by Linde Healthcare).

According to one embodiment, the temperature and relative hygrometry of the carrier gas have to be measured, without needing to be controlled, and the flow-rate of the carrier gas has to be measured and controlled according to a defined setpoint. As an example, and without limiting the scope of the present patent: air injected at a flow-rate of 20 l/min through the filter under test, the measured temperature and hygrometry of which being 23° C. and 60% relative hygrometry, respectively, at atmospheric pressure.

According to one embodiment, the probe gas is at least one amongst:

carbon dioxide (CO2), nitrous oxide (N2O), an alkane such as methane, ethane, propane, iso-propane, butane, pentane, or hexane, propylene, isobutene, an ether such as methoxymethane, compounds of the family of halogenated gases including haloalkanes such as chloromethane (CH3Cl), bromobutane, hydrofluorocarbons (HFCs), chlorofluorocarbons (CFCs), hydrochlorofluorocarbons (HCFCs), hydrobromofluorocarbons (HBFCs), bromofluorocarbons (BFCs).

The probe gas is different from the target gases of the adsorbent filter considered. The probe gas is chosen so as not to be trapped by the adsorbent material which only slows down the passage of the probe gas compared to the carrier gas (e.g. air). For example, CO2 with a purity greater than 99%, injected from a bottle of compressed CO2 expanded to 2 bar via a pressure gauge, is an appropriate choice for activated carbon adsorbent filters.

By "chosen so as not to be trapped", the person skilled in the art will understand that the probe gas should have an adsorption isotherm such that, at a partial pressure of 0.1 atmospheres of probe gas, the adsorption isotherm has to have an adsorption capacity of less than 100 µmol of probe gas per gram of adsorbent. As an example, an MOF type adsorbent, specifically developed to trap CO2 (e.g. in the document "Dynamics of CO2 adsorption on Amine Adsorbents. 1. Impact of Heat Effects", Bollini et al., Ind. Eng. Chem. Res. 2012, 51, 46, 15145-15152, or further "Processing and performance of MOF (Metal Organic Framework)-loaded PAN nanofibrous membrane for CO2 adsorption", Wahiduzzaman et al., Journal of Materials Engineering and Performance, volume 25, pages 1276-1283, 2016) which henceforth becomes a target gas, could not have CO2 as probe gas and a person skilled in the art will have to turn to other probe gases. As an example, but not limited to, the following probe gases are good candidates for most adsorbents: carbon dioxide (CO2), nitrous oxide (N2O), an alkane such as methane, ethane, propane, iso-propane, butane, pentane, or hexane, propylene, isobutene, an ether such as methoxymethane, compounds of the family of halogenated gases including haloalkanes such as chloromethane (CH3Cl), bromobutane, hydrofluorocarbons (HFCs), chlorofluorocarbons (CFCs), hydrochlorofluorocarbons (HCFCs), hydrobromofluorocarbons (HBFCs), bromofluorocarbons (BFCs)

According to one embodiment, the steps (d) to (f) are carried out occasionally, repeatedly or periodically.

An occasional measurement means determining the saturation level of the filter from a single series of the steps (d) to (f).

Repeated measurements can be made e.g. every minute for 5 minutes, provided that the absolute value of the time derivative of the concentration of probe gas downstream of the adsorbent filter has returned to a value less than 10 ppbv/s after each occasional measurement. In this way it is possible to take the average of the measurements of saturation level of the filter, and to obtain therefrom a more accurate estimate of the instantaneous saturation of the filter.

Periodic measurements, whether carried out via a single (occasional) measurement or a plurality of (repeated) measurements at close intervals, can be carried out, e.g. every day, in order to precisely follow the change over time of the saturation of the filter.

A further subject matter of the invention is a test bench comprising:
- a flow regulator, the inlet of which is configured for being connected to a source of carrier gas and the outlet of which is configured for being connected to the gas inlet of an adsorbent filter;
- a temperature indicator, a pressure indicator and a hygrometry indicator connected to the inlet of the flow regulator;
- a probe gas injector the inlet of which is configured for being connected to a source of probe gas and the outlet of which is connected to the outlet of the flow regulator;
- a probe gas detector configured for being connected to the gas outlet of the adsorbent filter; and
- a signal processing and control module connected to the probe gas detector, the flow regulator, the temperature, pressure and hygrometry indicators, the probe gas injector, the probe gas detector and the signal processing module of said test bench being configured for performing the method for determining residual capacity as defined above.

The temperature indicator, the pressure indicator and the hygrometry indicator can e.g. be sensors or regulators (thermometer, pressure gauge e.g. for temperature and pressure). The measurement of the hygrometry is important because the hygrometry has an impact on the curve of concentration of probe gas downstream of the filter as a function of time. The abacuses produced take the above into account.

Thereby, the flow regulator is used for maintaining the flow of carrier gas at constant flow-rate through the constituent material of the adsorbent filter; the temperature and hygrometry indicators (e.g. sensors or regulators) being used for knowing the hygrometry level and the temperature of the system at the time of measurement; the probe gas injector being used for the injection, upstream of the adsorbent filter gas inlet, of a probe gas into the flow of carrier gas with rapid changes of concentration (greater than 100 ppmv/s); the probe gas detector being used for the measurement of the curve of the concentration of probe gas as a function of time downstream of the gas outlet of the adsorbent filter; and the signal processing module being used for the analysis of the measured curve of concentration of probe gas and the determination of the residual capacity of the adsorbent filter according to said analysis.

In one embodiment, the probe gas detector is at least one amongst: an infrared (IR) detector such as a single IR detector, a Fourier transform IR detector or a non-dispersive IR detector, a mass spectrometer, a photoacoustic detector, a katharometer, and an electrochemical detector.

The probe gas detector must have a short response time compared to the duration of the measured sudden variation (case of an injection of a sudden signal of probe gas or case of a rising edge or a falling edge step), typically at least 10 acquisitions during the period of time of the sudden variation so that the concentration of probe gas downstream of the adsorbent filter over time (so-called continuous measurement) can be measured. The above differentiates the present system from a breakthrough measuring system, because the response time of the detector has to be substantially shorter in the case of the present invention, e.g. at least 1 Hz.

According to one embodiment, the probe gas injector is a valve controlled by an electronic control module apt to open and to close in less than 50 ms, e.g. a solenoid valve controlled by a computer, a pneumatic valve, an electromagnetically controlled valve, an injection loop associated with a flow limiter, the flow-limiter being connected to a expansion valve connected to a cylinder of compressed probe gas. Thereby, the control of the valve connected to the source of probe gas is used for generating a sudden variation of probe gas in the flow of carrier gas. The above differentiates the present system from a breakthrough measuring system, because the response time of the valve has to be substantially shorter in the case of the present invention, in order to open and to close in a few milliseconds.

According to one embodiment, the probe gas injector is a flow regulator controlled by an electronic control module, the flow regulator having a valve apt to open and to close in less than 50 ms. Thereby, the control of the flow regulator connected to the source of probe gas is used for generating a sudden variation in the concentration of probe gas in the flow of carrier gas.

According to one embodiment, the probe gas injector is a gas syringe.

Unlike the state of the art, the probe gas according to the invention is chosen so as not to be trapped by the adsorbent material of the filter. As such, the invention is thus non-destructive and different from a breakthrough method: the method used does not reduce the filtration capacity of the tested filter. In addition, the injection times of the probe gas are very small (on the order of a few seconds) compared to the efficiency periods of the adsorbent filter with respect to a target gas (on the order of a few hours). There is therefore a difference in nature (non-destructive) and parameters (time periods, testing means, nature of the gas) between the present method and a breakthrough measurement.

BRIEF DESCRIPTION OF THE DRAWINGS

In order to better illustrate the subject matter of the present invention, a
preferred embodiment will be described hereinafter, as an illustration, but not limited to, with reference to the enclosed drawings.

On the present drawings:

FIG. 6b is a graph illustrating the change over time of the concentration of probe gas downstream of the filter with the injection of a falling edge step;

DETAILED DESCRIPTION

Figure 1:
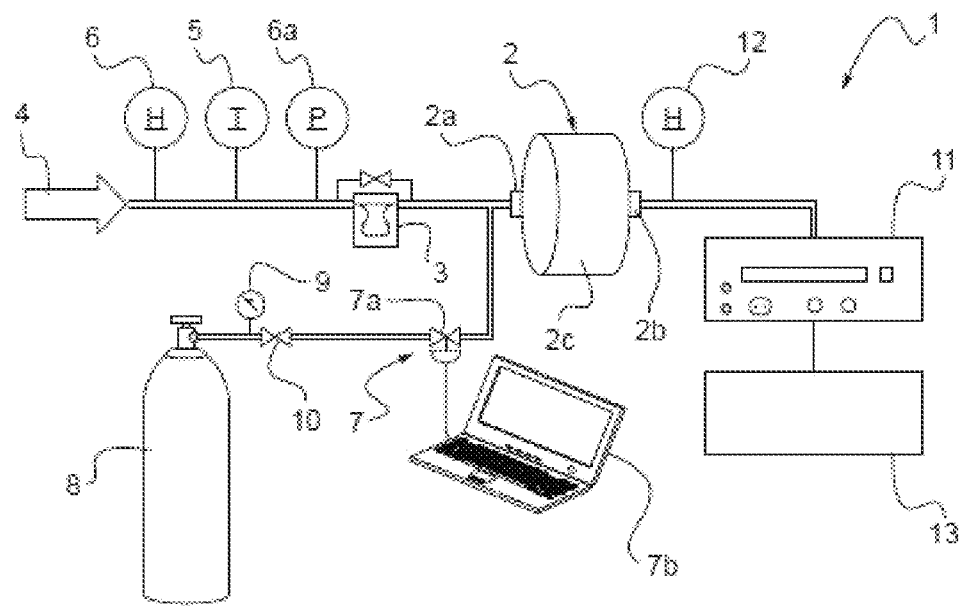
FIG. 1 is a functional diagram of a test bench according to the present invention.

FIG. 1 shows a test bench 1 according to the present invention configured for determining the residual filtration capacity of an adsorbent filter 2.

The adsorbent filter 2 comprises a gas inlet 2a, a gas outlet 2b and an adsorbent material 2c arranged between the gas inlet 2a and the gas outlet 2b.

The adsorbent filter 2 can e.g. be a filter for a respiratory mask or a filter for purifying the air with respect to a polluting product in a vehicle.

The adsorbent materials purify a gas crossing through same, such as air, with regard to one or a plurality of target gas products.

The test bench 1 comprises a flow regulator 3, the inlet of which is fluidically connected to a carrier gas source 4 and the outlet of which is fluidically connected to the gas inlet 2a of the adsorbent filter 2.

The carrier gas contained in the carrier gas source 4 is at least one among: air, oxygen (O2), hydrogen (H2), nitrogen (N2), argon (Ar), helium (He), the above-mentioned pure gas mixtures used as calibration gas during calibration, over- or under-oxygenated gas mixtures such as the mixtures used for deep diving (examples: Trimix®, heliair, heliox, surox, nitrox, Triox or helitrox), medical gases (e.g. nitrous oxide, equimolar oxygen-nitrous oxide mixtures (French acronym MEOPA), nitric oxide (NO)), pulmonary function testing (French acronym EFR for Exploration Fonctionelle Respiratoire) gases, breathing mixtures such as helium/oxygen and other gas mixtures used for the treatment of certain hearing losses (MEDI OD 93, MEDI OD 95).

The test bench 1 further comprises a temperature indicator (e.g. sensor or regulator) 5, an hygrometry indicator (e.g. sensor or regulator) 6 and a pressure indicator 6a fluidically connected to the inlet of the flow regulator 3.

The flow regulator 3, and the temperature and hygrometry indicators 5 and 6 and pressure indicator 6a thus let pass a flow-regulated flow of carrier gas through the adsorbent material 2c of the adsorbent filter 2, the temperature and hygrometry of the measurement being known.

The test bench 1 further comprises a probe gas injector 7, the inlet of which is fluidically connected to a probe gas source 8 such as a gas cylinder via a pressure gauge 9 and an expansion valve 10, the outlet of which being fluidically connected at the outlet of the flow control valve 3.

The probe gas injector 7 is thereby used for causing, upstream of the gas inlet 2a of the adsorbent filter 2, a sudden variation in the concentration of probe gas of a predefined length of time, in the flow of carrier gas. The sudden variation can e.g. be a peak in the concentration of probe gas in the carrier gas, a through in the concentration of probe gas in the carrier gas, or further a rising or a falling step in the concentration of probe gas in the carrier gas.

The probe gas contained in the probe gas source 8 is chosen so as not to be trapped by the adsorbent material of the filter. By "chosen so as not to be trapped", the person skilled in the art will understand that the probe gas should have an adsorption isotherm such that, at a partial pressure of 0.1 atmospheres of probe gas, the adsorption isotherm has to have an adsorption capacity of less than 100 μmol of probe gas per gram of adsorbent.

In the present case, the probe gas injector 7 consists of a solenoid valve 7a controlled by a computer 7b. It should be noted that the probe gas injector 7 could also be any type of valve controlled by an electronic control module (e.g. a solenoid valve controlled by a computer, a pneumatic valve or an injection loop), without departing from the scope of the present invention. The control of the solenoid valve 7a by the computer 7b is used for generating a sudden variation in the concentration of probe gas in the flow of carrier gas. The valve is apt to open and to close in 50 ms so as to generate sudden variations of concentration of the probe gas in the carrier gas.

The test bench 1 further comprises a probe gas detector 11 fluidically connected to the gas outlet 2b of the adsorbent filter 2.

The probe gas detector 11 is thus used for measuring the curve of concentration of probe gas as a function of time downstream of the gas outlet 2b of the adsorbent filter 2.

An additional hygrometry indicator (e.g. a sensor or regulator) 12 is preferentially also fluidically connected to the gas outlet 2b of the adsorbent filter 2.

The probe gas detector 11 is an infrared detector with a short response time (e.g. an infrared CO2 detector in the case of a probe gas such as CO2), but could also be any other suitable detector for detecting the probe fluid, such as any type of infrared detector (e.g. simple IR detectors, Fourier transform IR detectors or non-dispersive IR detectors), mass spectrometer, photoacoustic detector, katharometer or electrochemical detector, without departing from the scope of the present invention.

The test bench 1 further comprises a signal processing module 13 connected to the probe gas detector 11. The signal processing module 13 is used for analyzing the curve of concentration of the probe gas measured by the probe gas detector 11 and for determining the residual capacity of the adsorbent filter 2 based on said analysis. It should be noted that the signal processing module 13 could also be connected to the computer 7b, without departing from the scope of the present invention.

Figure 2:
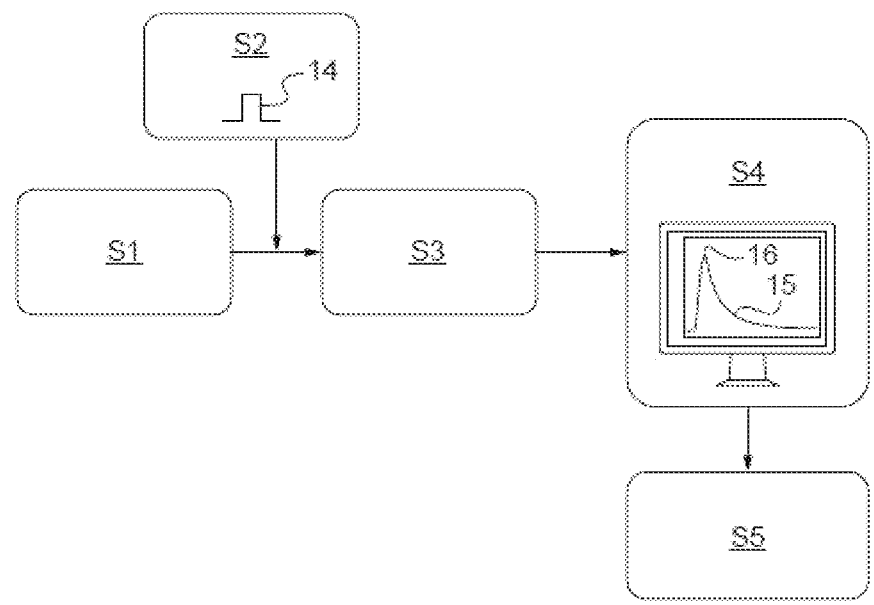
FIG. 2 is a flowchart representing a method for determining residual capacity according to the present invention.

FIG. 2 shows a flowchart showing the steps of the method for determining the residual capacity of the adsorbent filter 2 using the test bench 1.

The non-destructive method for determining the residual filtration capacity of an adsorbent filter of a given type, the adsorbent filter being apt to adsorb a target gas, comprises the following steps:
  (a) selecting a probe gas and a carrier gas suitable for passing through an adsorbent filter of the given type, unsaturated with target gas without remaining trapped thereto, the probe gas being intended for being mixed with the carrier gas, for being injected into the adsorbent filter of the given type,
  (b) at a given operating temperature, pressure and hygrometry, selecting parameters for the injection of probe gas and carrier gas into an adsorbent filter of the given type, the injection parameters comprising, for the probe gas and the carrier gas, a given period and a flow-rate over time curve, the concentration of the probe gas in the carrier gas including at least one sudden variation during the injection period,
for an adsorbent filter of the given type, called reference filter,
  (c) injecting, at the given operating temperature, pressure and hygrometry, the probe gas and the carrier gas into the reference filter according to the injection parameters of the step (b) and measuring the change over time in the concentration of the probe gas, downstream of the reference filter for known increasing amounts of target gas adsorbed by the reference filter, the latter of such quantities corresponding to the breakdown of the reference filter, and deducing the filtration capacity $m_a$ of the reference filter, for an adsorbent filter of the given type for which the residual filtration capacity is to be determined, called filter under test, (d) injecting, at the given operating temperature, pressure and hygrometry, the probe gas and the carrier gas into the filter under test according to the injection parameters of the step (b) and measuring the change over time in the concentration of the probe gas; downstream of the filter under test, (e) comparing the change over time of the concentration of the probe gas for the filter under test and for the reference filter, for determining a saturation value of the filter under test $\tau_{sft}$, and (f) deducing the residual filtration capacity of the filter under test by the following calculation: residual filtration capacity=$(1-\tau_{sft})*m_a$.

The step (d) of the method for determining residual capacity proceeds as follows for the filter under test: the regulation S1 of the flow-rate, at given operating temperature, pressure and hygrometry, using the flow regulator 3 and the temperature 5, pressure 6a and humidity indicators 6, of a flow of carrier gas coming from the carrier gas source 4; the injection S2, using the probe gas injector 7 from the probe gas source 8, of a sudden variation in the concentration of probe gas in the flow of carrier gas; the flow S3 of the regulated flow of carrier gas carrying the sudden variation 14 of the probe gas through the adsorbent material 2c of the adsorbent filter 2, the front of the probe gas thus advancing into the layers of the adsorbent material 2c; the measurement S4, by the probe gas detector 11, of the curve of concentration of probe gas 15 as a function of time downstream of the gas outlet 2b of the adsorbent filter 2.

The method continues during the steps (e) and (f) with the analysis S5 of the curve of concentration of the probe gas 15 measured with the signal treatment module 13 and the determination of the residual capacity of the adsorbent filter 2 based on said analysis, the signal treatment module 13 being used for fitting the measured curve of concentration of the probe gas 15 so as to trace back the indicators of the saturation level of the adsorbent filter 2.

Thereby, the method according to the invention is used for accurately and reliably measuring the saturation of the adsorbent material 2c of the adsorbent filter 2 so as to determine the residual capacity of the adsorbent filter 2 in a non-destructive and non-specific manner.

The analysis S5 of the curve of concentration of the probe gas 15 comprises the search for a sudden variation, in the example shown, a concentration peak 16 on the curve of concentration of the probe gas 15, and the determination of the residual capacity of the adsorbent filter 2 comprises the comparison of the values of the parameters representative of the concentration peak 16 found, with an existing database of peak values (or existing abacuses) so as to determine the residual capacity of the adsorbent filter 2.

Since the shape of the curve of concentration of the probe gas 15 is dependent on the saturation level of the adsorbent filter 2, the value of the concentration peak 16 found on the curve of concentration of the probe gas 15 can thereby be used for determining the saturation level of the adsorbent filter 2 tested, and thereby the residual filtration capacity thereof.

In a variant or furthermore, the analysis S5 of the curve of concentration of the probe gas 15 can comprise the calculation of the time of decrease of the concentration peak 16 found. The decrease time is defined as the time elapsed for changing a concentration of probe gas from 95% to 5% of the maximum value of the measured concentration peak. Furthermore or in a variant, the determination of the residual capacity of the adsorbent filter 2 can comprise the comparison of the calculated value of decrease of concentration with an existing database, performed via the step (c) of the present method, of decrease values (or existing abacuses) so as to determine more precisely the residual capacity of the adsorbent filter 2.

Furthermore or in a variant, the analysis S5 of the curve of concentration of the probe gas 15 can comprise the calculation of the time period between the start of the sudden variation in concentration of probe gas 14 in the flow of carrier gas and the quantifiable start of the increase of the concentration peak 16 found, and the determination of the residual capacity of the adsorbent filter 2 can further comprise the comparison of the calculated time period value with an existing database of time period values (or existing abacuses) in order to more precisely determine the residual filtration capacity of the adsorbent filter 2.

Furthermore or in a variant, the analysis S5 of the curve of concentration of the probe gas 15 can comprise the fitting of the measured curve of concentration of the probe gas by means of the calculation of fitting parameters and the determination of the residual capacity of the adsorbent filter 2 can further comprise the comparison of said calculated fitting parameters with an existing database or with a theoretical fitting.

The concentration of the probe gas injected into the flow of carrier gas is constant during the predefined length of time of the sudden variation of probe gas 14. Thereby, a zero concentration of probe gas 14 is injected, e.g. 2 seconds after the start of the test, then a sudden variation, e.g. over 20 ms, leading to reaching a concentration of probe gas 14 of 4000 ppmv, with a concentration plateau, e.g. for 1 second, at 4000 ppmv before going back, e.g. again within 20 ms, to a zero concentration of probe gas 14 in the flow of carrier gas. The concentration of probe gas is zero throughout the test, except between two limits defining the sudden variation in the probe gas 14. Between the two limits (t=0 and t=T), the concentration of probe gas 14 is non-zero and constant. The length of time of the sudden variation (T) is thereby defined as the length of time during which the concentration of probe gas 14 sent is equal to C=C0.

It should be noted that the concentration of the probe gas injected into the flow of carrier gas could also vary during the predefined length of time of the sudden variation of probe gas 14, without departing from the scope of the present invention. The concentration of probe gas C can also e.g. have a sinusoidal change over time of the type C=C0 sin($\Omega$*t) with $\Omega=\pi/T$, and a value of zero otherwise.

A plurality of successive measurements of the residual filtration capacity can be made in order to more reliably and accurately determine the residual capacity of the adsorbent filter 2, from one test to another.

An occasional measurement means determining the saturation level of the filter from a single series of steps (d) to (f).

Repeated measurements can be made e.g. every minute for 5 minutes, provided that the absolute value of the time derivative of the concentration of probe gas 14 downstream of the adsorbent filter has returned to a value less than 10 ppbv/s after each occasional measurement. In this way it is possible to take the average of the measurements of saturation level of the filter, and to obtain therefrom a more accurate estimate of the instantaneous saturation of the filter.

Figure 3:
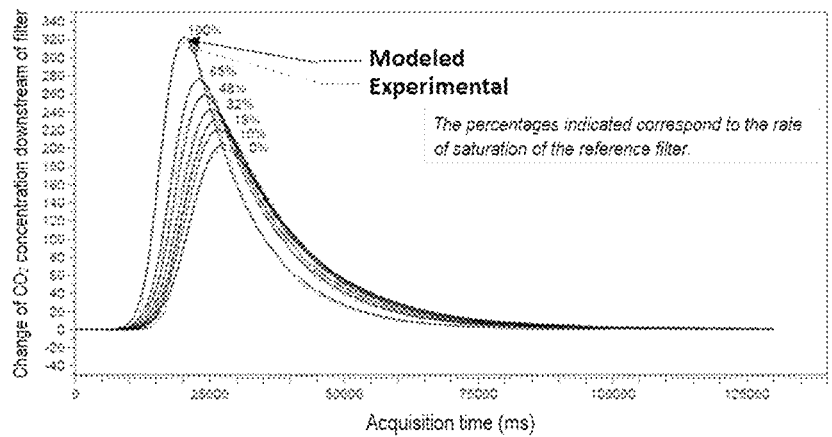
FIG. 3 is a graph representing experimental and fitting curves of the concentration of $CO_2$ downstream of an adsorbent filter as a function of time, for different saturation levels of the adsorbent filter.

FIG. 3 shows, as an example, experimental curves and fitting curves of the CO2 concentration as a function of time downstream of the adsorbent filter 2, for different saturation levels of the adsorbent filter 2 (i.e., 0%, 10%, 19%, 32%, 48%, 65% and 100%).

During such experiments, as an example, the probe gas injector 7 generated sudden variations in the concentration of CO2 in the flow of carrier gas, for a time period of one second, from a cylinder of CO2 (50 bars) and expanded to 0.6 bar relative in an air flow at 20 l·min−1, 23° C. and 40% RH (relative hygrometry), and atmospheric pressure, through an activated carbon bed of a filter for respiratory mask filter as adsorbent filter 2.

The probe gas detector 11 (herein, an infrared CO2 detector with a short response time) recorded, every 500 ms, downstream of the adsorbent filter 2, the concentration of the probe gas (CO2) as a function of time.

The different experimental curves obtained vary with the saturation of the adsorbent filter 2. When the sudden variation in the concentration of gas probe, herein a peak, is produced on a bed with a low saturation level, the height of the concentration peak of the probe gas downstream of the filter is smaller than when the measurement is made on the same adsorbent material the saturation level of which is higher.

The different curves shown in FIG. 3 represent the change of the peak of the curve of concentration of the probe gas with the increase in the saturation level of the bed of activated carbon with sorbed target agent (herein, physisorbed but same could be a chemisorbed target agent) for seven experimental tests (i.e., for a saturation level of 0%, 10%, 19%, 32%, 48%, 65% and 100%, respectively).

The dotted-line curves each represent an average of the experimental values of downstream concentrations resulting from the passage of the sudden CO2 signal through a bed of activated carbon as a function of time in a flow of carrier air at 20 l·min−1, 4% RH and 23° C., each dotted line curve corresponding to the percentage of saturation indicated near the peak concentration thereof.

The solid line curves represent the mathematical fitting of the experimental curves.

The experimental curves obtained are fitted by the following equation (1):

$$y = x_4 + \frac{1}{2} \cdot \frac{x_5}{x_3} \times \exp\left(\frac{1}{2} \cdot \left(\frac{x_2}{x_3}\right)^2 - \frac{t - x_1}{x_3}\right) \times \mathrm{erfc}\left(\frac{\frac{x_2}{x_3} - \frac{t - x_1}{x_2}}{\sqrt{2}}\right) \quad \text{[Math. 3]}$$

where exp is the exponential function, erfc is the complementary error function, y is the concentration, t is the time, and $x_1$ to $x_5$ correspond to the five parameters of the equation, which are determined by a mathematical calculation software program, for finding an equation curve according to the above equation, which is closest to the curve found experimentally, by means of a difference minimization method, e.g. by the so-called least squares method.

In practice, to obtain a fitting, experimental measurements are entered into a mathematical calculation software program, along with the above equation to be fitted, and the calculation software program will calculate the values of the parameters x1 to x5 which give a theoretical curve according to the above equation closest to the experimental values.

Some parameters of the equation used for the fine fitting of the concentration peak measured downstream of the adsorbent filter 2, are dependent on the saturation level of the adsorbent filter 2. Thereby, the more saturated the adsorbent filter 2, the higher the concentration peak of CO2 downstream of the adsorbent filter 2. Moreover, the more saturated the adsorbent filter 2, the faster the decrease in concentration after the peak. Finally, the time between the generation of the sudden signal and the rise in concentration downstream of the filter is all the shorter as the adsorbent filter 2 becomes saturated.

For each experimental curve shown in FIG. 3, five sudden one-second variations in the concentration of CO2 with an acquisition time of 130 seconds, were injected into the carrier air flow. During the first injection, a balancing of the system takes place, the first curve being slightly higher than the following curves. In order to avoid a dispersion of the results, the first curve was discarded because same shows the balancing of the adsorbent system. The following four sudden signals were then averaged. It is the experimental mean curve (in dotted line in FIG. 3) which was then fitted mathematically (solid line in FIG. 3).

It has been found that the most reliable parameter for measuring the saturation level of the adsorbent filter 2 is the parameter x3. Indeed, same is the parameter which shows the most significant variation over the saturation level range of the adsorbent filter, thus having the largest derivative with respect to the saturation level, and which has a monotonous evolution with respect to the saturation level. Nevertheless, other parameters or combinations of parameters (e.g. peak height, x1, etc.) can also be used for yielding the saturation level of the adsorbent filter 2, provided that same satisfy the two aforementioned criteria.

Figure 4:
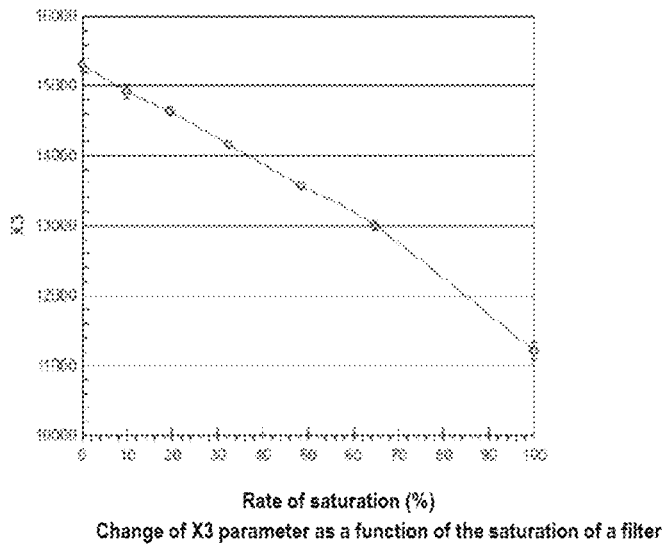
FIG. 4 is a graph representing the change over time of a fitting parameter of the experimental curves shown in FIG. 3 as a function of the saturation level of the adsorbent filter.

Referring now to FIG. 4, we can see that the figure shows the evolution of the fitting parameter x3 as a function of the saturation level of the adsorbent filter 2, the parameter x3 coming from Math. 2 during the approximation by the least squares method obtained in FIG. 3, and the monotonous character thereof and the significant change as a function of the saturation level, can be seen.

By controlling the poisoning of the adsorbent filter 2 through the filling of the porosity of the adsorbent material with a target or parasitic gas, abacuses can be produced as a function of the saturation level of the adsorbent filter 2.

By carrying out the experiment described in FIG. 3 (i.e. five successive sudden injections of CO2) as the porosity of the adsorbent material is filled with a target gas, it is possible to obtain the curve representing, in FIG. 4, the decrease of the parameter x3 (parameter related to the decrease in concentration of the concentration peak of the probe gas) as a function of the saturation level of the adsorbent filter 2.

It should be noted that the parameter x3 obtained by fitting increases as a function of the mass of activated carbon of the adsorbent filter 2, while the maximum of the concentration peak decreases as a function of the mass of activated carbon of the adsorbent filter 2.

The experiment just described was carried out with a poisoning of the porosity of the adsorbent filter 2 by a physisorbed vapor (reversible surface phenomenon). However, the same approach was also carried out with a chemisorbed vapor (irreversibly attached to the surface) for a similar result, which demonstrates that the method according to the invention is universal and suitable for any type of gas trapped by an adsorbent material.

Figure 5A:
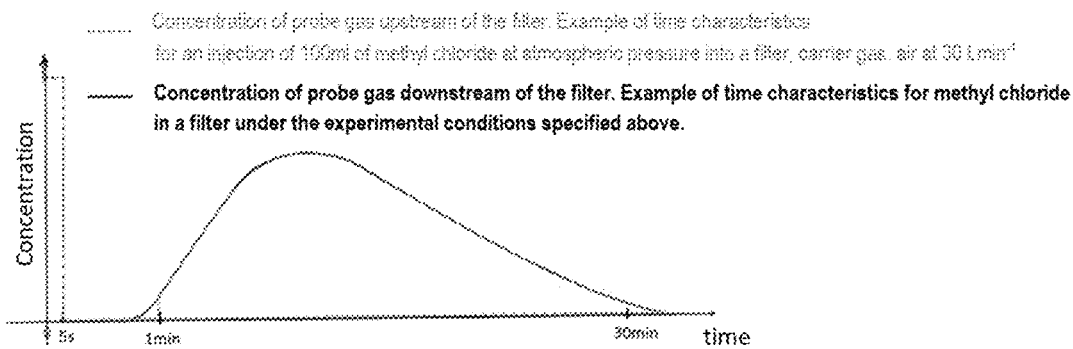
FIG. 5a is a graph illustrating the change over time of the concentration of probe gas downstream of the filter with the injection of a sudden variation of concentration of probe gas upstream of the filter, for a first example of probe gas.
Figure 5B:
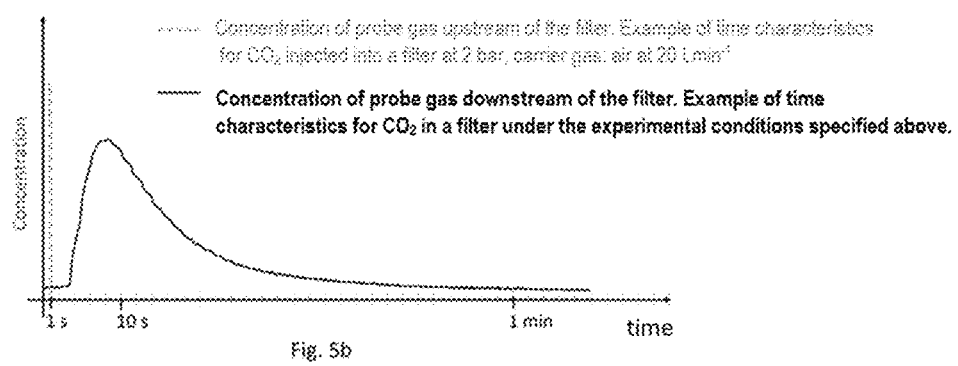
FIG. 5b is a graph illustrating the change over time of the concentration of probe gas downstream of the filter with the injection of a sudden variation of concentration of probe gas upstream of the filter, for a second example of probe gas.

By setting up regular tests on adsorbent filters using the method of the invention, it is possible:
  to prevent a systematic change of adsorbent filters in place without knowing whether or not the filter can still be used;

to test adsorbent filters and know the initial filtration capacities thereof;

to limit the size of the filters, by means of a finer monitoring of the saturation thereof, and thus to save energy, since a smaller adsorbent filter has a smaller pressure drop;

to replace adsorbent filters which are defective, prematurely saturated, e.g. by residues of exhaust pipes; and FIGS. 5a and 5b illustrate the injection of a sudden signal of probe gas upstream of the filter (broken line) and the change over time of the concentration of probe gas downstream of the filter, FIG. 5b illustrating an example of characteristic times for the $CO_2$ injected at 2 bar, on a filter for a respirator mask, the carrier gas being air at 20 l/min and hygrometry stabilized at 80%, FIG. 5a illustrating an example of characteristic times for methyl chloride injected via a gas syringe (100 ml at atmospheric pressure), into a filter for a respirator mask, the carrier gas being air at 30 l.min-1 and 50% hygrometry.

Figure 6A:
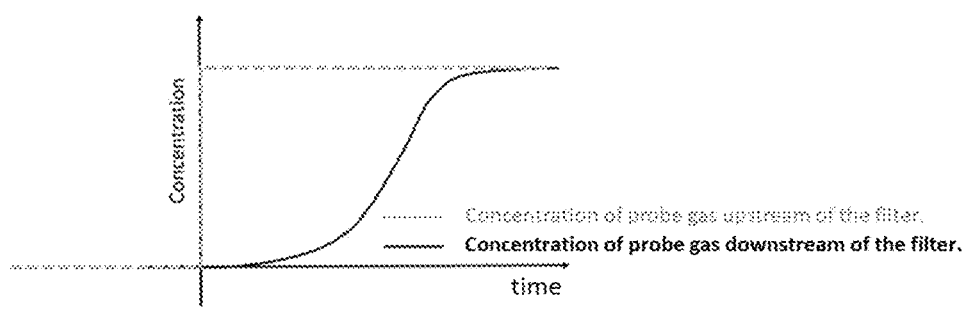
FIG. 6a is a graph illustrating the change over time of the concentration of probe gas downstream of the filter with the injection of a rising edge step.

FIGS. 6a and 6b correspondingly illustrate the injection of a rising edge of probe gas upstream of the filter, and the change over time in the concentration of probe gas downstream of the filter, and the injection of a falling edge of the probe gas upstream of the filter, and the change over time in the concentration of probe gas downstream of the filter.

Such examples illustrate the innovative character of the invention, by the choice of the probe gas which is not trapped by the adsorbent material of the adsorbent filter, and for which the change in concentration downstream of the filter is used on the basis of a sudden variation in concentration upstream of the filter.

Figure 7:
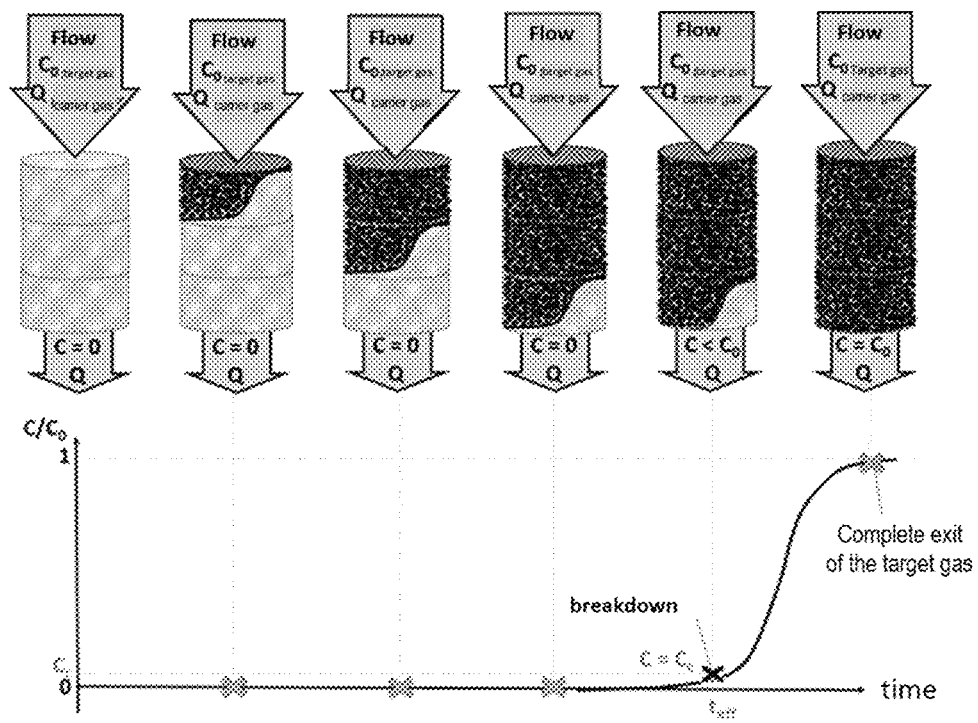
FIG. 7 is an illustration of a classic breakthrough curve showing the change over time of the saturation level of the adsorbent filter.

FIG. 7 describes a conventional breakthrough curve. The target product at constant concentration C0 is injected into the adsorbent filter. A target concentration Cc is defined, not to be exceeded at the outlet of the adsorbent filter. The breakdown corresponds to obtaining the target gas concentration C, downstream of the filter, equal to Cc. The efficiency period of the adsorbent filter corresponds to the time elapsed between the start of injection of the target gas upstream of the filter and the moment of obtaining of C=Cc downstream of the filter.

Figure 8:
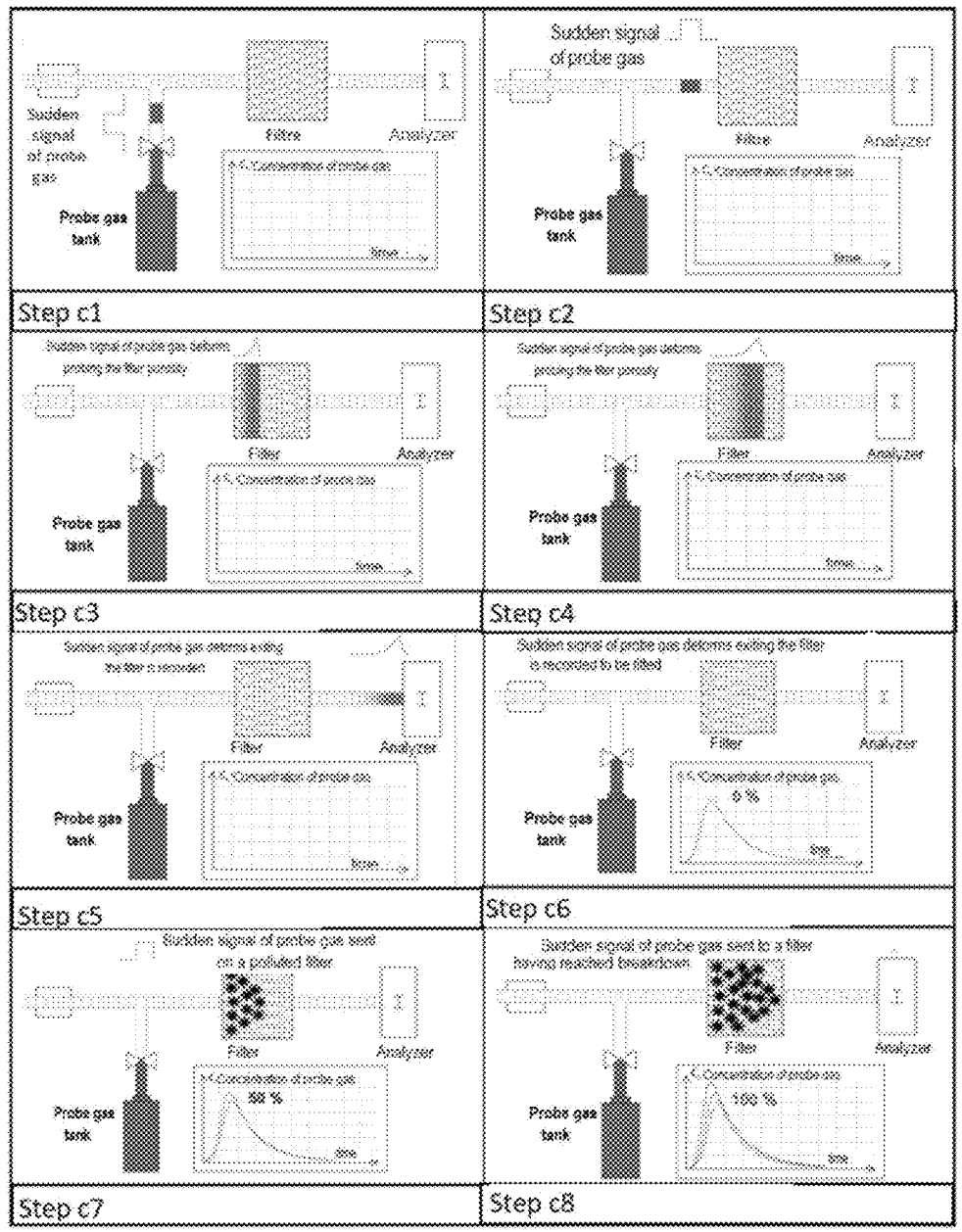
FIG. 8 is a diagram given as an example illustrating the method according to the invention.

As an example, the preliminary production of the abacuses, corresponding to the step (c) of the method described hereinabove, is described in FIG. 8, and is carried out as follows.

For a plurality of values of the level of saturation of the adsorbent filter, herein the reference filter, a sudden variation of the probe gas is sent, herein a peak of concentration of the probe gas in the carrier gas.

During the step c1, the concentration peak is generated by the tank of probe gas and sent to the adsorbent filter during the step c2. It can be seen that during the steps c1 to c6, the filter is unsaturated (0%). During the steps c3 and c4, the peak of probe gas crosses through the adsorbent filter, then, during the step c5, the concentration of probe gas downstream of the adsorbent filter is measured, so as to obtain the curve of change over time of the concentration of probe gas in the carrier gas, as illustrated in step c6, corresponding to the filter in the state entirely unsaturated with target gas.

The steps are then repeated with different saturation states of the adsorbent filter (50% during the step c7, 100% during the step c8) so as to obtain the curves of change over time of the concentration of probe gas in the carrier gas, as illustrated during the step c8.

Such curves can then be used for determining the saturation state of a filter under test, during the steps (d) to (f) of the method of the invention.

Table 1 below explains the protocol followed and illustrates the differences between the invention and a conventional breakthrough bench, with 5 injections of CO2 probe gas for the sudden variation in the concentration of probe gas downstream of the reference filter for the method according to the invention:

TABLE 1

| Testing steps | Testing set-up according to the invention | Classic breakthrough bench |
|---|---|---|
| 1. Generation of 5 injections of $CO_2$ probe gas into an adsorbent filter in the initial state, for a flow-rate of 20 l/minute of carrier gas (air at atmospheric pressure, 23° C., 70% relative hygrometry). Injection of 4000 ppmv of $CO_2$ for 1 second. | X | |
| 2. Filling the filter with cyclohexane target gas, up to 10% of $t_{eff}$* | | X |
| 2a. Generation of 5 injections of $CO_2$ probe gas into the adsorbent filter for the saturation level of 10% | X | |
| 3. Filling the filter with target gas up to 19% of $t_{eff}$* | | X |
| 3a. Generation of 5 injections of $CO_2$ probe gas into the adsorbent filter for the saturation level of 19% | X | |
| 4. Filling the filter with target gas up to 32% of $t_{eff}$* | | X |
| 4a. Generation of 5 injections of $CO_2$ probe gas into the adsorbent filter for the saturation level of 32% | X | |
| 5. Filling the filter with target gas up to 48% of $t_{eff}$* | | X |
| 5a. Generation of 5 injections of $CO_2$ probe gas into the adsorbent filter for the saturation level of 48% | X | |
| 6. Filling the filter with target gas up to 65% of $t_{eff}$* | | X |
| 6a. Generation of 5 injections of $CO_2$ probe gas into the adsorbent filter for the saturation level of 65% | X | |
| 7. Filling the filter with agent up to $t_{eff}$* and determining the amount of target gas injected for achieving such breakdown. | | X |
| 7a: Generation of 5 injections of $CO_2$ probe gas on the broken down adsorbent filter, i.e. a saturation level of 100%. | X | |

*$t_{eff}$ = filter efficiency time previously measured under the same test conditions (temperature, hygrometry, flow-rate and concentration of target gas)

The abacus can be used for identifying a change in the concentration peaks of CO2 probe gas downstream of the filter, as the saturation of the latter increases (see FIG. 3). Equation (1) can be used for mathematically approximating the curve, by a classical algorithm for minimizing the distance between an experimental curve and a theoretical curve. The parameter x3 is thus measured for different saturation levels of the adsorbent filter (see FIG. 4). The different measured values of x3 for different saturation levels are then linked by an affine approximation in order to establish a one-to-one function between the value of x3 thus determined and the saturation level of the filter.

This abacus is specific to this fitting of an adsorbent filter, this hygrometry (70% relative hygrometry) and this temperature (23° C.). Other abacuses have to be produced for other models of adsorbent filters, hygrometry, temperature.

As an example, the method of the invention is illustrated in the context of measuring the saturation level of an adsorbent filter for a respiratory mask:

1/Choice of carrier gas: air at atmospheric pressure, crossing through the adsorbent filter at with measured temperature of 20° C. and measured relative hygrometry of 40%.

2/Choice of probe gas: $CO_2$, of purity 99.9%

3/Injection of $CO_2$ according to the curve shown in FIG. 5b

4/Measurement of the concentration of $CO_2$ at the frequency of 2 Hz, using a Fourier transform infrared detector and recording of said values for 130s from the start of the injection of $CO_2$ upstream of the filter 5/Approximation of the concentration of $CO_2$ measured downstream of the filter using equation 1, and use of a conventional algorithm for minimizing the distance between the experimental curve and the theoretical curve, so as to obtain the value of $x_3$.

6/Comparison of the value of $x_3$ with a table of abacuses produced on a reference filter prior to the test, looking at the abacus produced on this adsorbent filter model, this temperature (23° C.) and this hygrometry (40%): obtaining the value of the saturation level from the graph curve giving the saturation level as a function of the value of $x_3$.

At the end of the steps, the saturation level of the filter is known, without the saturation level of the filter under test having been increased. The filter can thus still be used.

It is understood that the particular embodiment which was just described was given as an indication, and is not limited to, and that modifications can be made thereto without departing from the present invention.

The invention claimed is:

1. A non-destructive method for determining the remaining filtration capacity of a given type of an adsorbent filter, the adsorbent filter being suitable for adsorbing a target gas, wherein the method comprises the following steps:
   (a) selecting a first gas to be used as a probe and a second gas used as a carrier gas, both gases being able to pass, without remaining trapped, through the given type of adsorbent filter, unsaturated with target gas therein, the first gas having an adsorption isotherm such that at a partial pressure of 0.1 atmosphere of the first gas, the adsorption isotherm has an adsorption capacity of less than 100 μmol of first gas per gram of adsorbent, the first gas being intended for being mixed with the second gas, for injection into the given type adsorbent filter, the second gas having an adsorption isotherm such that, at a partial pressure of 0.1 atmospheres of second gas, the adsorption isotherm has an adsorption capacity of less than 100 μmol of second gas per gram of adsorbent,
   (b) at a given operating temperature, pressure and hygrometry, selecting parameters for the injection of first gas and second gas into an adsorbent filter of the given type, the injection parameters comprising, for the first gas and the second gas, a given period and a flow-rate over time curve, the concentration of the first gas in the second gas including at least one abrupt variation during the injection period, each abrupt variation in the concentration of the first gas being characterized by an absolute value of the time derivative of the concentration of the first gas, which exceeds 100 ppmv/s,
   for an adsorbent filter of the given type, called reference filter,
   (c) injecting, at the given operating temperature, pressure and hygrometry, the first gas and the second gas into the reference filter according to the injection parameters of the step (b) and measuring, downstream of the reference filter, the evolution of the first gas concentration as a function of time for known increasing amounts of target gas adsorbed by the reference filter, the last amount corresponding to the breakthrough of the reference filter, and deducing the shut-off capacity $m_a$ of the reference filter as the mass concentration of target gas delivered during the injection time until the breakthrough multiplied by the flow rate through the filter multiplied by the time measured between the start of target gas injection at constant concentration and the time measured to reach the breakthrough concentration,
   for an adsorbent filter of the given type for which the remaining filtration capacity is to be determined, called filter under test,
   (d) injecting the first gas and the second gas into the filter, at the given operating temperature, pressure and hygrometry, the first gas and the second gas into the filter under test according to the injection parameters of the step (b) and measuring downstream of the filter under test, the evolution of the first gas concentration as a function of time;
   (e) comparing the evolution of the first gas concentration as a function of time for the filter under test and for the reference filter, by mathematical analysis of the first gas concentration curve downstream of the filter as a function of the time to extract a signature from the curve representative of an abrupt variation upstream of the filter, the signature varying with the saturation rate of the filter, the signature extracted from the mathematical analysis of the first gas concentration curve downstream of the filter being one of:
   the transition time from 95% to 5% of the maximum value of the first gas concentration downstream of the adsorbent filter obtained after the abrupt variation in first gas concentration;
   the value of the first gas concentration peak measured downstream of the filter during the duration of the test;
   the time period between the start of the abrupt variation of the first gas in the second gas flow and the quantifiable start of a change of concentration of first gas downstream of the filter;
   one or a combination of parameters of a multi-parameter model of the first gas concentration curve measured downstream of the filter which, over the range of the saturation rate of the reference filter, has a monotonic variation and a maximum derivative depending on the saturation rate,
   and then comparing the signature between the filter under test and the reference filter to a saturation rate value of the filter under test $T_{sft}$, and
   (f) deducing the remaining filtration capacity of the filter under test by the following calculation: remaining filtration capacity=$(1-T_{sft})*M_a$.

2. The method according to claim 1, wherein the second gas is at least one among: air, oxygen ($O_2$), hydrogen ($H_2$), nitrogen ($N_2$), argon (Ar), helium (He), the above-mentioned pure gas mixtures used as calibration gas during calibration, over- or under-oxygenated gas mixtures such as the mixtures used for deep diving, trimix, heliair, heliox, surox, nitrox, triox or helitrox, medical gases, nitrous oxide, equimolar oxygen-nitrous oxide mixtures, nitric oxide (NO), pulmonary function testing (French acronym EFR for Exploration Fonctionelle Respiratoire)) gases, breathing mixtures such as helium/oxygen and other gas mixtures used for the treatment of certain hearing losses (MEDI OD 93, MEDI OD 95).

3. The method according to claim 1, wherein the first gas is at least one amongst: carbon dioxide ($CO_2$), nitrous oxide ($N_2O$), an alkane such as methane, ethane, propane, isopropane, butane, pentane, or hexane, propylene, isobutene, an ether such as methoxymethane, compounds of the family of halogenated gases including haloalkanes such as chloromethane ($CH_3Cl$), bromobutane, hydro fluorocarbons (HFCs), chlorofluorocarbons (CFCs), hydrochlorofluorocarbons (HBFCs), hydrobromofluorocarbons (HBFCs), bromofluorocarbons (BFCs).

4. The method according to claim 1, wherein the steps (d) to (f) are carried out occasionally, repeatedly or periodically.

5. The method according to claim 2, wherein the first gas is at least one amongst: carbon dioxide ($CO_2$), nitrous oxide ($N_2O$), an alkane such as methane, ethane, propane, isopropane, butane, pentane, or hexane, propylene, isobutene, an ether such as methoxymethane, compounds of the family of halogenated gases including haloalkanes such as chloromethane ($CH_3Cl$), bromobutane, hydro fluorocarbons (HFCs), chlorofluorocarbons (CFCs), hydrochlorofluorocarbons (HBFCs), hydrobromofluorocarbons (HBFCs), bromofluorocarbons (BFCs).

6. The method according to claim 2, wherein the steps (d) to (f) are carried out occasionally, repeatedly or periodically.

7. The method according to claim 3, wherein the steps (d) to (f) are carried out occasionally, repeatedly or periodically.

8. The method according to claim 5, wherein the steps (d) to (f) are carried out occasionally, repeatedly or periodically.

* * * * *